(12) United States Patent
Okanda et al.

(10) Patent No.: US 7,174,234 B2
(45) Date of Patent: Feb. 6, 2007

(54) SERVO TOOL UNIT ATTACHMENT AND DETACHMENT METHOD

(75) Inventors: Koichi Okanda, Yamanashi (JP); Ryusuke Ogawa, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/199,176

(22) Filed: Aug. 9, 2005

(65) Prior Publication Data

US 2006/0030967 A1 Feb. 9, 2006

(30) Foreign Application Priority Data

Aug. 9, 2004 (JP) ............................. 2004-232739

(51) Int. Cl.
*G06F 19/00* (2006.01)
*B25J 9/16* (2006.01)

(52) U.S. Cl. .......................................... 700/179; 483/1
(58) Field of Classification Search ................ 700/179, 700/245; 901/38; 483/901, 1
See application file for complete search history.

(56) References Cited

U.S. PATENT DOCUMENTS 6,840,895 B2 * 1/2005 Perry et al. .................. 483/1

FOREIGN PATENT DOCUMENTS

JP 5-69362 3/1993

OTHER PUBLICATIONS

European Search Report and Annex dated Nov. 4, 2005 of Application No. EP 05 01 7017.

* cited by examiner

*Primary Examiner*—Leo Picard
*Assistant Examiner*—Steven R. Garland
(74) *Attorney, Agent, or Firm*—Staas & Halsey LLP

(57) ABSTRACT

A robot controller issues a command to move a servo tool unit to a servo tool unit detachment position. During this movement, a command is issued to stop power supply to an amplifier of the servo tool unit, and a process of invalidating a disconnection error of a power line and a signal line and a process of invalidating servo parameters are executed. The robot controller confirms that power supply has been stopped, and that the process of invalidating the disconnection error and the process of invalidating the servo parameters have been completed. When the robot arrives at a servo tool unit detachment position, a mechanical servo tool unit detachment process is executed. With the attachment of the servo tool unit, a software process required for attachment is executed during a next movement after mechanical attachment of the servo tool unit.

5 Claims, 4 Drawing Sheets

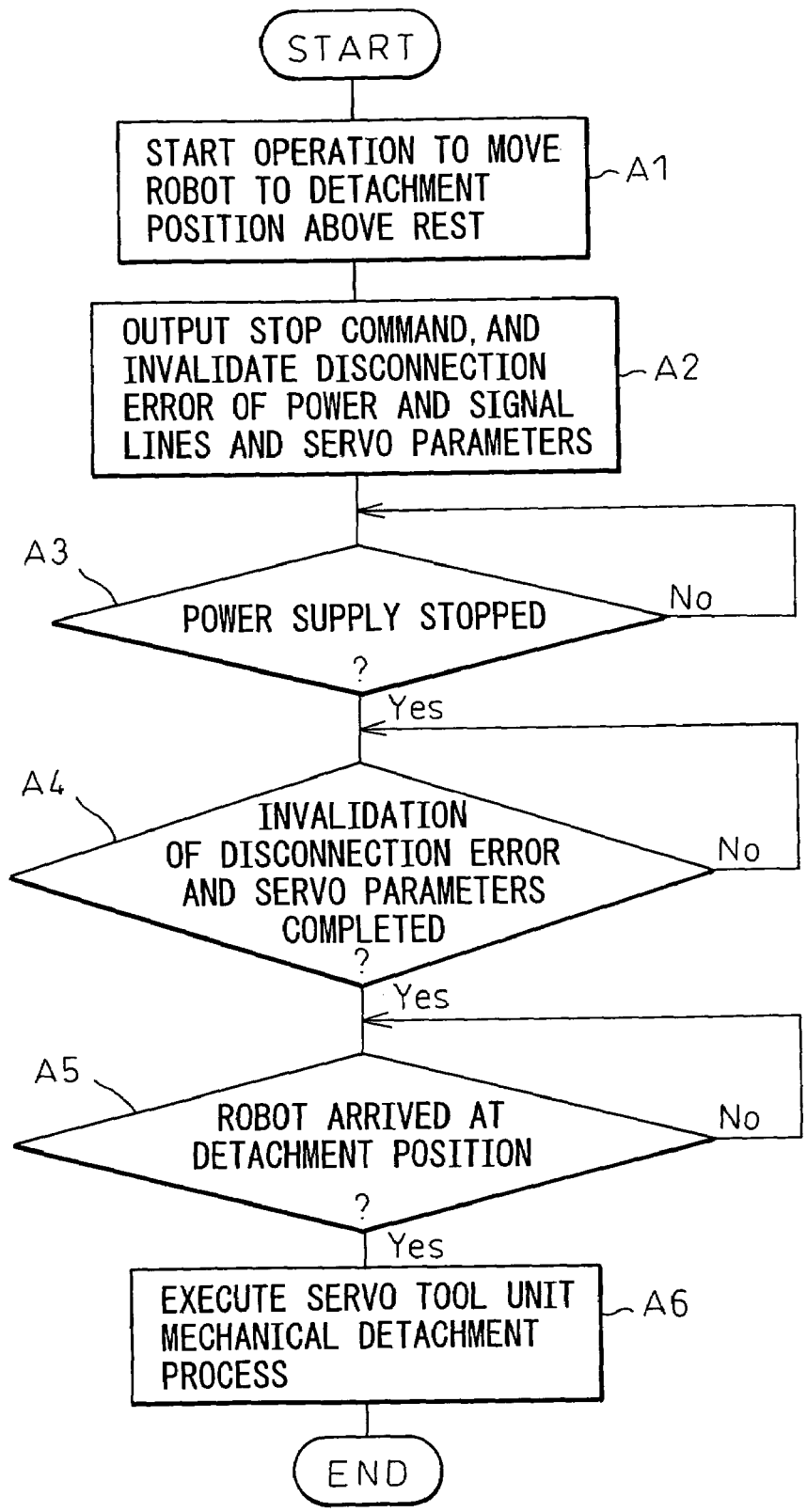

SERVO TOOL UNIT ATTACHMENT AND DETACHMENT METHOD

BACKGROUND OF THE INVENTION

1. Field of the Invention

The present invention relates to a method of attaching or detaching a servo tool unit of servo motor drive type mounted at the forward end of an arm of a robot and a robot controller for carrying out the method.

2. Description of the Related Art

The tool unit mounted at the forward end of the robot arm includes a servo tool unit of servo motor drive type such as a welding gun and a hand. Such a servo tool unit is controlled together with the robot by a robot controller. When the servo tool unit mounted on the tool mounting portion provided at the forward end of the robot arm is changed automatically, the mechanical detachment and attachment of the servo tool unit from/to the tool mounting portion and the software processing for electrically disconnecting and connecting a motor are required. In the prior art, the mechanical detachment of the servo tool unit and the software process involved with the electrical disconnection of the motor including the processes of invalidating the disconnection error of a power line and a signal line, confirming the motor stop and invalidating the servo parameters are executed at the position where the servo tool unit is mechanically detached. Similarly, the mechanical attachment of the servo tool unit and the software process involved with the electrical connection including the processes of validating the disconnection error of the power line and the signal line, confirming the motor start and validating the servo parameters are executed at the position where the servo tool unit is mechanically attached.

In the conventional servo tool unit detachment method executed when automatically changing the servo tool unit, the mechanical detachment and the software process for the electrical disconnection of the motor are executed at the same position. This poses the problem of a long down time of the robot at the time of detaching the servo tool unit. Similarly, in the conventional servo tool unit attachment method, the mechanical attachment and the software process for the electrical connection of the motor are executed at the same position, and therefore the down time of the robot is long at the time of attaching the servo tool unit. As a result, the problem is posed that the proportion of time during which the robot is actually used for production is reduced, resulting in a deteriorated working efficiency.

SUMMARY OF THE INVENTION

Accordingly, it is an object of the present invention to reduce an actual time required for detaching/attaching the servo tool unit and thus improve the working efficiency of the robot.

According to one aspect of the present invention, there is provided a servo tool unit detachment method for detaching a servo tool unit driven by a servo motor from a tool mounting portion in a robot to thereby automatically change a servo tool unit, the robot having the servo tool unit mounted on the tool mounting portion provided at a forward end of an arm of the robot, the servo tool unit controlled by a robot controller, the method comprising the steps of: starting to move the robot having the servo tool unit mounted on the tool mounting portion to a servo tool unit detachment position; executing, during movement of the robot, a process of invalidating a disconnection error due to the disconnection of a power line and a signal line of the servo motor for driving the servo tool unit and a process of invalidating a control of the servo motor of the servo tool unit; and mechanically detaching the servo tool unit from the tool mounting portion after the robot arrives at the servo tool unit detachment position.

According to another aspect of the present invention, there is provided a servo tool unit attachment method for attaching a new servo tool unit driven by a servo motor to a tool mounting portion in a robot to thereby automatically change a servo tool unit, the robot having the servo tool unit mounted on the tool mounting portion provided at a forward end of an arm of the robot, the servo tool unit controlled by a robot controller, the method characterized by comprising the steps of: executing a process of moving the robot having no servo tool unit mounted on the tool mounting portion to a servo tool unit attachment position; mechanically attaching a new servo tool unit to the tool mounting portion after the robot arrives at the servo tool unit attachment position; starting to move the robot to a predetermined position after completing to attach the new servo tool unit; and executing, during movement of the robot to the predetermined position, a process of validating a control of the servo motor of the servo tool unit and a process of validating the disconnection error of the power line and the signal line of the servo motor.

According to still another aspect of the present invention, there is provided a robot controller for controlling an execution of the servo tool unit detachment method described above.

According to yet another aspect of the present invention, there is provided a robot controller for controlling an execution of the servo tool unit attachment method described above.

While the robot is moving for detachment or attachment of the servo tool unit, the software process required for detachment or attachment of the servo tool unit is executed. This makes it possible to reduce the time consumed by the process required for detachment and attachment of the servo tool unit and thereby improve robot working efficiency.

BRIEF DESCRIPTION OF THE DRAWINGS

The above and other objects, features and advantages will be described below in more detail based on the preferred embodiments of the present invention with reference to the accompanying drawings, in which:

FIG. 2 is a flowchart of a process executed for detaching the servo tool unit in the robot system shown in FIG. 1.

DETAILED DESCRIPTION OF THE INVENTION

An embodiment of the present invention will be described below in conjunction with reference to the drawings.

Figure 1:
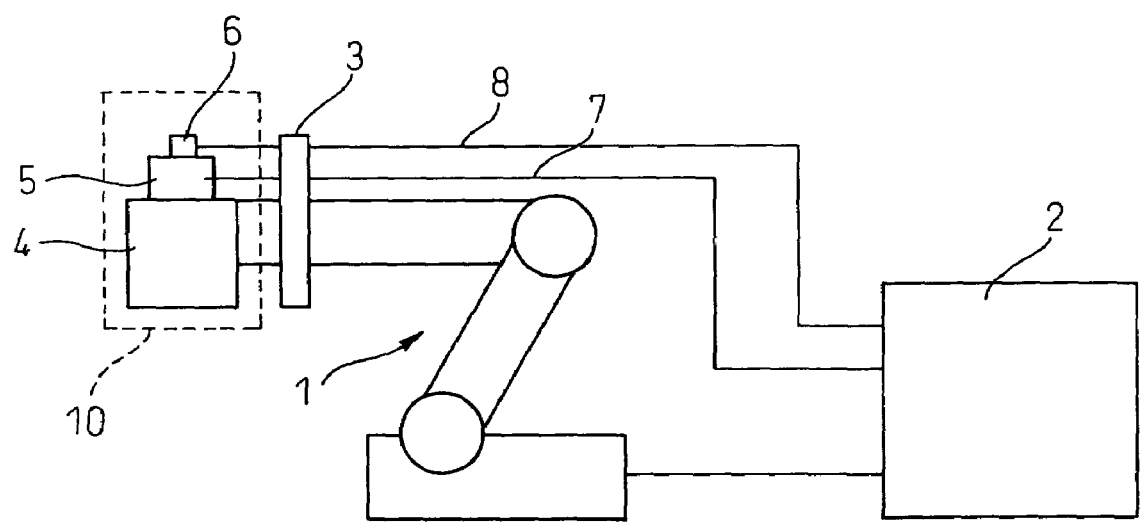
FIG. 1 is a schematic diagram of a robot system for executing a servo tool unit attachment and detachment method according to an embodiment of the present invention.

FIG. 1 is a schematic diagram of a robot system for executing a servo tool unit attachment and detachment method according to an embodiment of the present invention. The robot system includes a robot mechanical part 1 and a robot controller 2. The drive of the robot mechanical part 1 is controlled by the robot controller 2. A tool mounting unit 3 adapted to allow for automatic exchange of the servo tool units is disposed at the forward end of the arm of the robot mechanical part 1.

The servo tool unit 10 is adapted to be mounted at the forward end of the arm of the robot mechanical part 1 by the tool mounting unit 3.

The servo tool unit 10 includes a tool 4, a servo motor 5 for driving the tool 4, and a position and speed detector 6 for detecting a rotational position and rotational speed of the servo motor 5 to thereby detect a movement position and movement speed of a movable portion of the servo tool unit 10. This servo tool unit 10 is mounted on the tool mounting unit 3 through mechanical attachment. The servo motor 5 is connected with a power line 7 through the tool mounting unit 3, so that it is supplied with power through the power line 7 from the robot controller 2 and is driven. The position and speed detector 6 is also connected with the robot controller 2 through the signal line 8, so that the robot controller 2 can recognize the rotational position and rotational speed of the servo motor 5. Specifically, the robot controller 2 can control the servo motor 5 of the servo tool unit 10 in a way similar to that of controlling the drive of a servo motor for each joint axis of the robot mechanical part 1. Based on the feedback of the position and speed detected by the position and speed detector 6, the robot controller 2 thus executes the position loop control process, the speed loop control process and the current loop process to a move command issued to the servo motor 5 and then controls the drive of the servo motor 5 based on the move command after execution of the processes.

When exchanging the servo tool units 10, the servo tool unit 10 mounted on the tool mounting unit 3 is mechanically detached therefrom and at the same time the servo motor 5 and the position and speed detector 5 is electrically disconnected from the power line 7 and the signal line 8, after which a new servo tool unit 10 is mounted on the tool mounting unit 3. When removing the servo tool unit 10, the servo motor 5 and the power line 7 are disconnected from each other and so are the position and speed detector 6 and the signal line 8. Thus, a disconnection error occurs in the robot controller 2. Therefore, the process of invalidating the disconnection error is executed when detaching the servo tool unit 10 from the tool mounting unit 3. Also, the servo motor 5 and the power line 7 are disconnected from each other. Thus, after a stop command signal (a signal to turn off the switch for supplying power to the power line 7) is output to an amplifier of the servo motor 5 and a sensor or the like confirms that power has stopped being supplied to the power line 7, the servo motor 5 is electrically disconnected from the power line 7. Further, in order to invalidate the control of the servo motor 5, the process is executed to clear and invalidate the servo parameters including the servo gain and the torque limit value preset and stored in a storage means of the robot controller 2 to control the driving of the servo motor 5.

In the prior art, after the robot is positioned at a position where the servo tool unit 10 is mechanically detached from the tool mounting unit 3, the process of invalidating the disconnection error and the process of invalidating the control of the servo motor, and the process of stopping the power supply to the servo motor 5 and clearing and invalidating the stored values of the servo parameters, are executed at that position.

Also, when mounting the new servo tool unit 10 on the tool mounting unit 3, the process of validating the disconnection error of the power line 7 and the signal line 8 as well as the process of issuing a command to supply power to the servo amplifier, confirming the power supply, setting new servo parameters corresponding to the new servo tool 10 and validating the servo motor control are required in addition to the job of mechanically mounting the servo tool unit 10 on the tool mounting unit 3. Therefore, these processes are also executed after the robot is moved to the position where the servo tool unit 10 is mechanically attached to the tool mounting unit 3.

In the prior art, when the servo tool unit 10 is detached from or attached to the tool mounting unit 3, the software process for detachment or attachment of the servo tool unit 10 is executed at the position where the servo tool unit is detached or attached. This requires a long time for detachment and attachment of the servo tool unit 10.

In the present invention, in order to solve the problem, while the robot is moving for detachment or attachment of the servo tool unit, the software process required for detachment or attachment of the servo tool unit is executed to thereby reduce the operation processing time required for detachment or attachment of the servo tool unit.

FIG. 2 is a flowchart of a process executed by the processor of the robot controller 2 shown in FIG. 1 for detaching the servo tool unit.

When a servo tool unit detachment command is input, the processor of the robot controller 2 first issues a command to move the servo tool unit 10 mounted on the forward end of the robot arm (TCP (Tool Center Point) defined as a robot control point) to above a rest where the servo tool unit 10 is to be detached and drives the robot based on the command (step A1). During the movement of the servo tool unit 10, the processor of the robot controller 2 issues a stop command to the servo amplifier and starts the process of invalidating the disconnection error of the power line and the signal line. Further, in order to invalidate the control of the servo motor 5 of the servo tool unit 10, the processor of the robot controller 2 starts the process of clearing and invalidating the stored values of the servo parameters (step A2).

Next, it is confirmed, by means of a sensor or the like, whether or not the power supply to the power line 7 is stopped (step A3). In the case where the power supply is stopped, it is determined whether or not the process of invalidating the disconnection error and the process of invalidating the servo parameters are completed (step A4). After thus confirming that the process of invalidating the disconnection error and the servo parameters is completed, it is determined whether or not the process is completed for positioning the robot at a servo tool unit detachment position where the servo tool unit is to be detached (step A5). When the robot arrives at the servo tool unit detachment position, the process of mechanically detaching the servo tool unit 10 is executed (step A6).

In this way, the process of detaching the servo tool unit 10 is completed. The robot is then moved to the next operating position.

The servo tool unit 10 is not used during the time when the robot is moved to the servo tool unit detachment position. Therefore, during this movement, the software process for detaching the servo tool unit 10, i.e. the process of invalidating the disconnection error of the power and signal lines, stopping the power supply, confirming the stop, and invalidating the control of the servo motor 5 by invalidating the servo parameters (or clearing the storage), is executed. Thus, when the robot arrives at the decoupling position, only the mechanical detachment process is executed. As a result, according to the present invention, the time required to detach the servo tool unit 10 can be reduced.

Figure 3A:
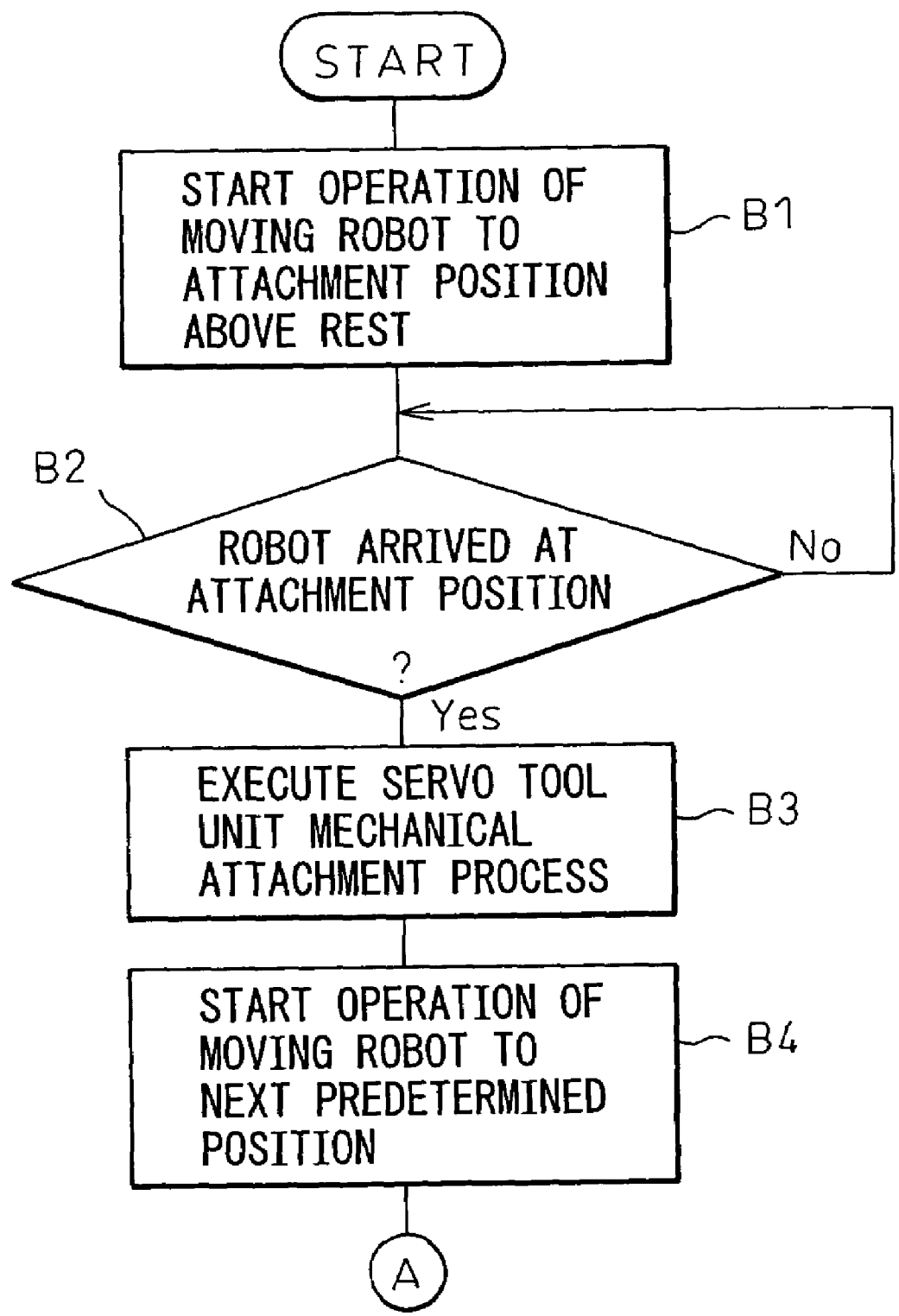
FIGS. 3A and 3B are flowcharts of a process executed for attaching the servo tool unit in the robot system shown in FIG. 1.
Figure 3B:
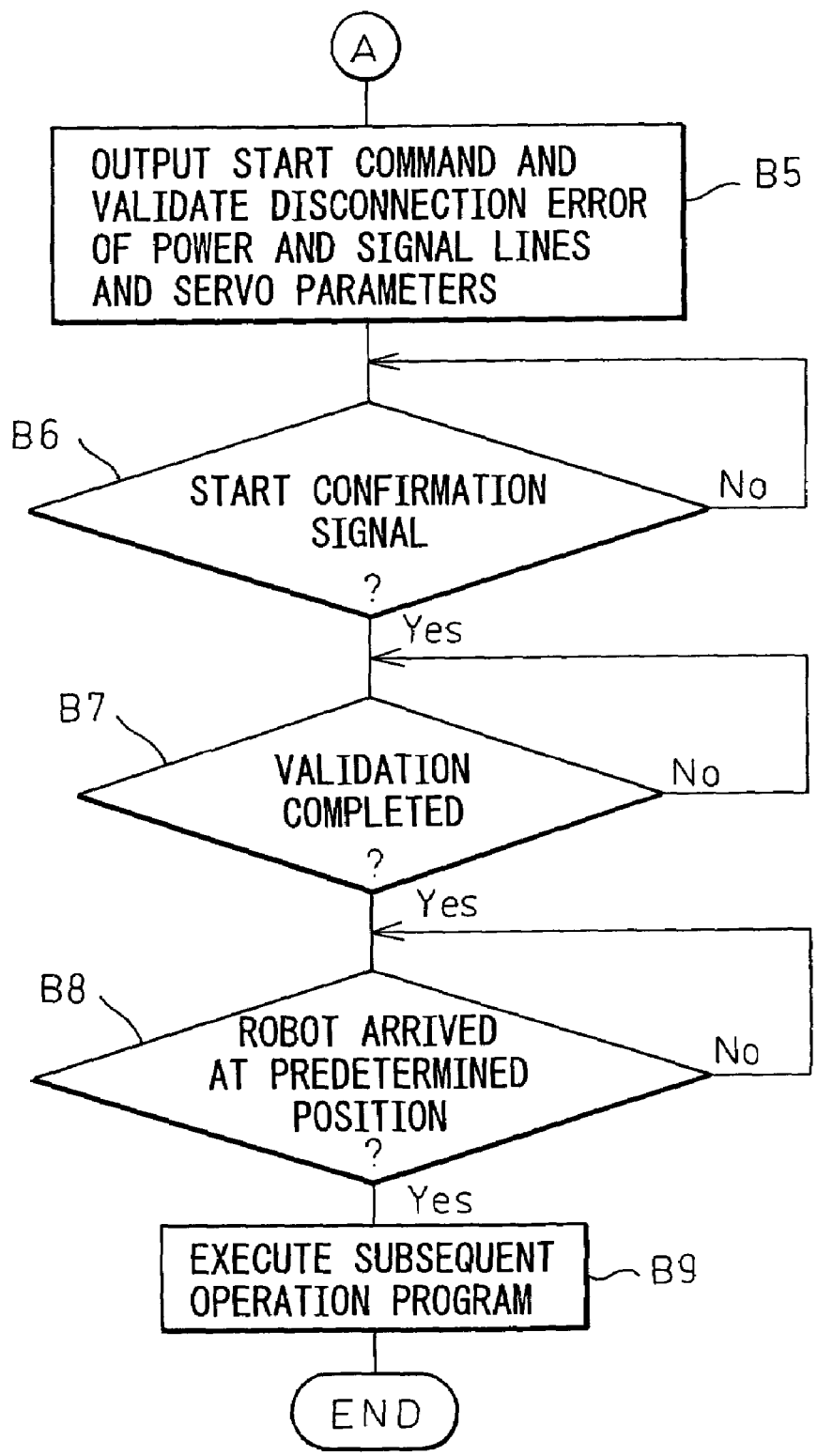

FIGS. 3A and 3B are flowcharts of a process executed for attaching the servo tool unit 10 on the tool mounting unit 3.

When a command to attach the servo tool unit 10 is input, the processor of the robot controller 2 starts the process shown in FIGS. 3A and 3B.

The processor of the robot controller 2 first issues a command to move the servo tool unit 10 mounted on the forward end of the robot arm (TCP defined as a robot control point) to the servo tool unit attachment position above the rest, and drives the servo motor for each axis of the robot mechanism 1 in accordance with the issued command (step B1). When the robot arrives at the servo tool unit attachment position (step B2), the process of mechanically attaching the servo tool unit 10 is executed (step B3). The processor of the robot controller 2, after completing the mechanical attachment process, issues a command to move the servo tool unit to the next position, as predetermined, so that the robot moves to the next position (step B4). At the same time, a start command is issued to the servo amplifier, to thereby turn on the switch for supplying power to the power line. Further, the process is started to validate the disconnection error of the power and signal lines thus far invalidated at the time of detaching the servo tool unit, and the validating process is started to set the servo parameters thus far cleared and invalidated, at a value suitable for the newly attached servo tool unit 10 (step B5).

Next, the processor of the robot controller 2 confirms whether or not the servo amplifier is activated. Specifically, the processor detects and confirms, by means of the sensor, whether or not power is supplied to the power line 7 (step B6). Also, the processor determines whether or not the process of validating the disconnection error and the servo parameters is completed (Step B7). In the case where the validating process is completed, the processor confirms whether the robot has arrived at the next predetermined position (step B8). In the case where the robot has arrived at the next predetermined position, the subsequent operation program starts to be executed (step B9) to thereby complete the servo tool unit attachment process.

In the case of attaching the servo tool unit 10, during the time when the robot is driven to move to the next predetermined position after the servo tool unit 10 is mechanically attached to the tool mounting unit 3, the servo motor 5 of the servo tool unit 10 is not driven. Therefore, during this movement, the software process required to attach the servo tool unit 10, i.e. the processes of activating the servo amplifier, validating the disconnection error of the power and signal lines, and validating the servo parameters, is executed. By doing so, the software process and the robot movement are executed concurrently and, therefore, the time required for executing the process of attaching the servo tool unit can be reduced. As a result, the proportion of the time during which the robot actually carries out the job is increased to thereby improve the robot working efficiency.

What is claimed is:

1. A servo tool unit detachment method for detaching a servo tool unit driven by a servo motor from a tool mounting portion in a robot to thereby automatically change a servo tool unit, said robot having said servo tool unit mounted on said tool mounting portion provided at a forward end of an arm of said robot, said servo tool unit controlled by a robot controller, said method comprising:
    starting to move said robot having said servo tool unit mounted on said tool mounting portion to a servo tool unit detachment position;
    executing, during movement of said robot, a process of invalidating a disconnection error due to the disconnection of a power line and a signal line of said servo motor for driving said servo tool unit and a process of invalidating a control of said servo motor of said servo tool unit; and
    mechanically detaching said servo tool unit from said tool mounting portion after said robot arrives at the servo tool unit detachment position.

2. A servo tool unit attachment method for attaching a new servo tool unit driven by a servo motor to a tool mounting portion in a robot to thereby automatically change a servo tool unit, said robot having said servo tool unit mounted on said tool mounting portion provided at a forward end of an arm of said robot, said servo tool unit controlled by a robot controller, said method characterized by:
    executing a process of moving said robot having no servo tool unit mounted on said tool mounting portion to a servo tool unit attachment position;
    mechanically attaching a new servo tool unit to said tool mounting portion after said robot arrives at the servo tool unit attachment position;
    starting to move said robot to a predetermined position after completing the attachment of said new servo tool unit; and
    executing, during movement of said robot to the predetermined position, a process of validating a control of said servo motor of said servo tool unit and a process of validating a disconnection error of a power line and a signal line of said servo motor.

3. A robot controller for controlling an execution of the servo tool unit detachment method according to claim 1.

4. The robot controller according to claim 3, further controlling an execution of the servo tool unit attachment method according to claim 2.

5. A robot controller for controlling an execution of the servo tool unit attachment method according to claim 2.

* * * * *